(12) United States Patent
Rahm et al.

(10) Patent No.: US 10,556,547 B2
(45) Date of Patent: Feb. 11, 2020

(54) ROOF RAIL

(71) Applicant: Dura Automotive Holdings U.K., Ltd, Birmingham (GB)

(72) Inventors: Werner Rahm, Wuppertal (DE); Alexander Kammertons, Plettenberg (DE)

(73) Assignee: DURA OPERATING, LLC, Auburn Hills, MI (US)

( * ) Notice: Subject to any disclaimer, the term of this patent is extended or adjusted under 35 U.S.C. 154(b) by 7 days.

(21) Appl. No.: 15/891,830

(22) Filed: Feb. 8, 2018

(65) Prior Publication Data

US 2018/0229666 A1  Aug. 16, 2018

(30) Foreign Application Priority Data

Feb. 10, 2017  (EP) .................................... 17155555

(51) Int. Cl.
*B60R 9/00* (2006.01)
*B60R 9/058* (2006.01)

(52) U.S. Cl.
CPC .................................... *B60R 9/058* (2013.01)

(58) Field of Classification Search
CPC ................................. B60R 9/058; B60R 13/04
USPC ........................................................ 224/330
See application file for complete search history.

(56) References Cited

U.S. PATENT DOCUMENTS

| | | | | |
|---|---|---|---|---|
| 5,975,391 A | * | 11/1999 | Aftanas | B60R 9/04 224/309 |
| 6,311,882 B1 | * | 11/2001 | Allison | B60R 9/04 224/309 |
| 8,657,370 B1 | * | 2/2014 | Pierce | B60R 13/06 296/210 |
| 2002/0037389 A1 | * | 3/2002 | Miyano | B29C 45/4407 428/99 |
| 2006/0131934 A1 | * | 6/2006 | Uchida | B60R 9/058 296/210 |
| 2008/0083800 A1 | * | 4/2008 | Mathew | B60R 9/04 224/326 |
| 2009/0021053 A1 | * | 1/2009 | Harberts | B60R 13/04 296/213 |
| 2014/0097218 A1 | * | 4/2014 | Bittner | B60R 9/04 224/309 |
| 2014/0131406 A1 | * | 5/2014 | Jutila | B60R 9/058 224/321 |
| 2015/0191127 A1 | * | 7/2015 | Sautter | B60R 9/08 224/331 |
| 2015/0232038 A1 | * | 8/2015 | Robertson | B60R 9/052 224/325 |

(Continued)

FOREIGN PATENT DOCUMENTS

DE  202013105598 U1  2/2014
WO  2014154688 A1  10/2014

*Primary Examiner* — Peter N Helvey
(74) *Attorney, Agent, or Firm* — Vivacqua Law, PLLC

(57) ABSTRACT

In order, in the case of a roof rail, which is to be fastened to a roof structure of a motor vehicle and which has a load-absorbing rail profile which is fastened to the motor vehicle via fastening means acting on a fastening leg, to make it possible, with a simultaneously simple manufacturing capability, to securely and permanently mount a decoration of very high-grade appearance, provision is made to connect a decorative profile to the rail profile via the fastening leg.

14 Claims, 1 Drawing Sheet

(56) References Cited

U.S. PATENT DOCUMENTS

2016/0280143 A1* 9/2016 Sato ................. B60R 9/045
2017/0015253 A1* 1/2017 Shibata ............. B60J 10/36

* cited by examiner

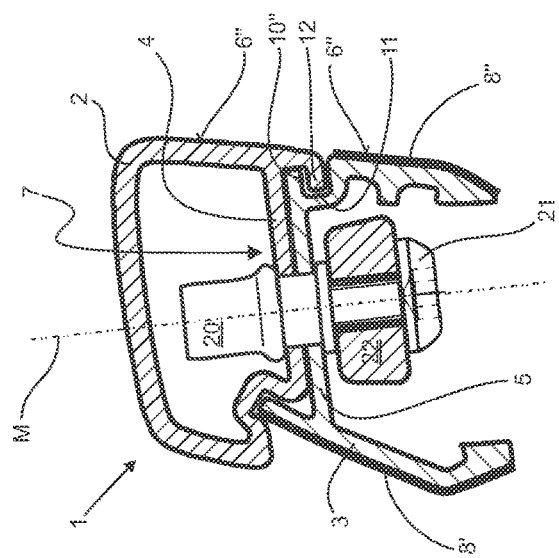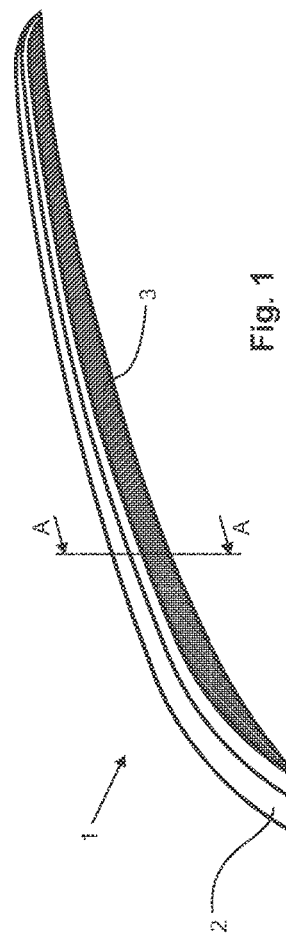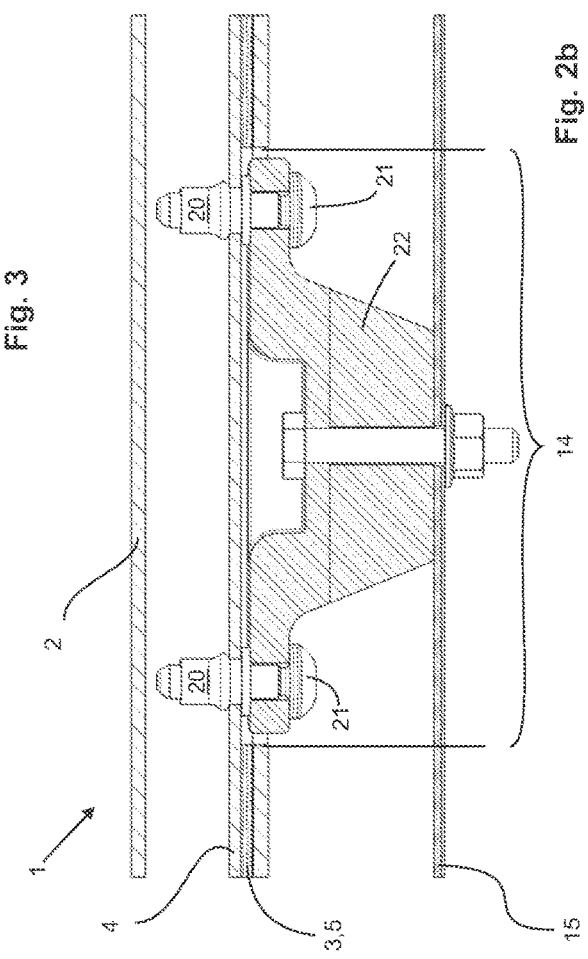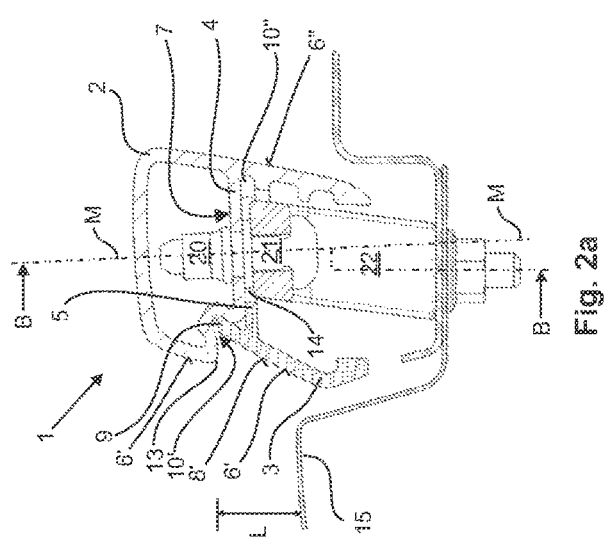

ROOF RAIL

CROSS-REFERENCE TO RELATED APPLICATION

This application is based on and claims the benefit of priority from European Application No. EP 17155555.0, filed on Feb. 10, 2017, the entire contents of which are incorporated by reference.

FIELD

The invention relates to a roof rail which is designed to be fastened to a roof structure of a motor vehicle.

BACKGROUND

The statements in this section merely provide background information related to the present disclosure and may or may not constitute prior art.

The invention relates to a roof rail which is designed to be fastened to a roof structure of a motor vehicle and which comprises a load-absorbing rail profile and, in at least one sub-portion, a decorative profile for forming at least a first lateral decorative surface.

Such roof rails allow visual concealment of any fastening system and, with a suitable design of the decorative profile, the visual adaptation, for instance harmonization with the car colour, or the visual accentuation, for instance by the deliberate use of another material, of at least one visible surface of the roof rail in relation to the vehicle body surrounding the roof rail.

A roof rail having a cover part is known from the disclosure WO 2014/154688 A1. After fastening a rail profile to the roof structure via a fastening angle which allows fastening means to act laterally on the rail profile, a covering screen is plugged laterally onto the rail profile in order to conceal the fastening structure. DE 20 2014 102 150 U1 discloses a roof rail arrangement in which a strip-like decorative cover is fitted onto a lateral surface of a rail profile and allows a visual accentuation of a partial surface of a rail profile.

In both cases, the fastening of the decorative part is achieved in particular by a latching or adhesive connection which is relatively prone to failure and limits the design possibilities of the combination of a load-absorbing rail profile and a decorative profile. In addition, the fact that the decorative cover is a merely plugged-on or glued-on cover component is evident in both cases, with the result that the quality impression to be achieved is rather low.

DE 10 2015 212 684 B3 discloses a longitudinally divided roof rail which comprises an upper part and a lower part. The lower part is a load-bearing constituent part of the roof rail.

SUMMARY

It is an object of the invention to make available a roof rail or a roof rail arrangement of the type stated at the outset that creates the possibility of presenting on a roof rail a decoration which is of very high-grade appearance and which in particular is capable of giving the impression that this is overall only a single profile made up of a profile strip. It is simultaneously intended to ensure a simple and cost-effective manufacturing capability of the roof rail and a permanently secure fastening of the decorative profile. It is intended for a person skilled in the art to have available as large a degree of freedom as possible in the structural design, in particular of the decorative profile.

The object is achieved according to the invention in that the rail profile has a fastening leg on which load-absorbing fastening means act directly when the roof rail is mounted as intended on the roof structure, in order to secure the rail profile to the roof structure, and the decorative profile is connected load-free to the rail profile via the fastening leg.

What is meant by "connected load-free" in this context is that, after the roof rail has been mounted as intended on the motor vehicle, the decorative profile does not also have to support the bearing load to be absorbed by the roof rail when used as intended. If the fastening means with which the roof rail, when mounted as intended on the vehicle, is connected to the roof structure, in order to introduce the loads into the roof structure, are connected to the rail profile such that the decorative profile is held load-free and therefore does not have to be designed for a load situation, this is convenient for the manufacturer in terms of material selection, material thickness, production methods and other factors determining the construction and ensures the greatest possible degrees of freedom.

There can be provision that the fastening means with which the rail profile is fastened to the roof structure are used in order simultaneously also to connect the decorative profile to the rail profile. In particular, the decorative profile can be prefixed on the rail profile via the fastening means with which the rail profile is also fastened to the roof structure.

The invention is based, inter alia, on the consideration that the fastening means which are in any case to be designed with high stability and which are to be concealed visually and which are used for fastening the ultimately load-absorbing rail profile are also to be used for fastening the decorative profile.

However, it is also conceivable for cutouts to be provided on the decorative profile, through which cutouts the fastening means with which the rail profile is fastened to the roof structure engage without simultaneously connecting the decorative profile to the rail profile.

In both aforementioned cases, any loads in a load situation are introduced directly from the rail profile into the roof structure. The decorative profile itself is not concomitantly subjected to forces by loads mounted on the roof rail, more precisely on the rail profile. At the same time, the design that the decorative profile is connected to the rail profile via the fastening leg which is in any case configured for a high degree of loadability and designed in such a way that any fastening means interact with the fastening leg in an externally non-visible manner allows a particularly secure and visually inconspicuous connection between decorative profile and rail profile. When designing the decorative profile, the manufacturer can thus concentrate substantially on its decorative function.

In order to connect the decorative profile to the rail profile in a permanently secure manner, there is provision that the decorative profile has, in at least the sub-portion, a decorative profile cross section with an inwardly pointing, preferably substantially horizontally oriented mounting leg which bears against the preferably likewise substantially horizontally oriented fastening leg, where appropriate with incorporation of an intermediate layer. The mounting leg preferably extends at least to the fastening position at which the fastening means act on the fastening leg of the rail profile, but preferably beyond this fastening position.

The roof rail can in this way be designed such that it at least visually gives the impression that it lies completely or at least substantially over its entire length on the outer roof skin, wherein, at least in the sub-portion in which the decorative profile is provided, a vertical gap between the rail profile and the outer roof skin is bridged by the decorative profile. However, there can, of course, also be provision that the roof rail is supported on posts, that is to say lies only in certain portions on the outer roof skin in the region of a post arrangement. The outer roof skin can further have a roof channel which extends in the longitudinal direction of the vehicle and which forms a depression with respect to the remainder of the outer roof surface and within which the roof rail is arranged in a slightly sunk manner on the bottom of the roof channel.

Preferably, the rail profile has a rail profile cross section and the decorative profile has a decorative profile cross section which together form an overall profile cross section with two substantially vertically oriented lateral surfaces, which in the completely mounted state preferably project down to the outer roof skin, and a substantially horizontally oriented central leg, wherein the central leg is formed at least in part by the fastening leg of the rail profile. The overall profile accordingly has in cross section an A-shaped or H-shaped basic form, wherein the H-shaped basic form is closed on the upper side.

In the case of such a basic form, there is provision that the decorative profile has a decorative profile cross section with a first lateral leg which forms the outer decorative surface and, starting from which, the mounting leg extends inwards. Here, the lateral leg of the decorative profile preferably forms only a part of the overall lateral surface of the overall profile cross section, in particular a lower part.

The rail profile and/or the decorative profile preferably have/has at least one groove-like depression into which an engagement leg of the respective other profile is inserted at least in part. As a result, it is possible to visually conceal the transition between the two profiles such that the latter does not have a disadvantageous appearance. There therefore do not occur any directly visible (longitudinal) joints between the two components into which dirt could be deposited in an externally visible manner over the life of the vehicle and which would allow the roof rail to appear from the outside as a multi-part component. In addition, such an inter-engagement of the two profiles can have a stability-increasing effect and contribute to the mutual positional definition of rail profile and decorative profile.

Such a visual interaction between decorative profile and rail profile is conceivable at various points of the roof rail in the region of the transition of decorative profile and rail profile. Thus, there can be provision for instance that the mounting leg forms, at its end facing away from the first lateral leg, an engagement leg which is inserted into an inwardly pointing and preferably horizontally oriented groove-like depression or receptacle provided on the rail profile. Alternatively or in addition, there can be provision that an outwardly pointing groove-like depression is formed on the decorative profile, into which depression an inwardly pointing engagement leg formed on the rail profile is inserted. The inwardly pointing engagement leg formed on the rail profile is preferably likewise horizontally oriented.

The described design of a roof rail also makes it possible in particular for the decorative profile, at least in the sub-portion in which it is provided, to be arranged completely below the rail profile. This in turn makes it possible for the decorative profile to form a first decorative surface on one side of an imaginary centre plane M of the roof rail or of the overall profile cross section and to form a second decorative surface on the other side of the centre plane M of the rail profile.

In so far as indications are made above and below regarding positionings, directions or orientations of the roof rail as a whole or of the rail profile or of the decorative profile or parts thereof or both profiles in relation to one another, these relate to the position and the state which the roof rail assumes overall after it has been mounted as intended on the vehicle.

The decorative profile, and also the rail profile, can be an extruded (light) metal profile which, for manufacture, can be fed in particular to bending or internal high-pressure forming processes and/or machining processes such as milling. In particular the material of the decorative profile can, however, be substantially freely chosen by virtue of the chosen roof rail construction which leaves the decorative profile load-free, with the result that, apart from being produced from the preferred light metal (aluminium alloy), the decorative profile can in particular also be produced from plastic. The construction keeping the decorative profile load-free also allows the use of materials, profile cross sections, fastening means and production methods which would not be suitable for a load-absorbing profile, for instance injection-moulding of the decorative profile, in particular even from plastics having a lower load-bearing capacity, and the adhesive bonding of decorative profile and rail profile.

The decorative surface formed on the decorative profile can, in particular, be anodized, painted or film-coated. However, there can, of course, also be provision that the material which forms the decorative profile also forms the decorative surface itself. The material of the decorative profile can be polished to form the decorative surface or have a surface structure which is incorporated in a targeted manner.

Further features and advantages of the invention will emerge from the subclaims and from the following description of preferred exemplary embodiments with reference to the drawings.

BRIEF DESCRIPTION OF THE DRAWINGS

The drawings described herein are for illustration purposes only and are not intended to limit the scope of the present disclosure in any way.

FIG. 1 shows a roof rail in a perspective overall view,

FIG. 2a shows a sectional view of a first possible embodiment of the roof rail shown in FIG. 1, FIG. 2b shows a side view of the roof rail shown in FIG. 2a, in section, and FIG. 3 shows a sectional view of a second possible embodiment of the roof rail shown in FIG. 1.

DETAILED DESCRIPTION

The following description is merely exemplary in nature and is not intended to limit the present disclosure, application, or uses.

FIG. 1 shows a roof rail 1 which, when mounted as intended, lies continuously on the roof structure 15 of a motor vehicle roof or is at least arranged thereon in such a way that such an impression is given. The roof rail 1 is longitudinally divided and has a strip-shaped rail profile 2 as upper part and a strip-shaped decorative profile 3 as lower part, by means of which a lateral decorative surface (illustrated by cross-hatching in FIG. 1) is realized. This multi-part configuration of the roof rail 1 consisting of a plurality of profile strips is not directly visible from FIG. 1.

FIG. 2a and FIG. 3 illustrate two alternative possible embodiments of the structure of the longitudinally divided roof rail 1 shown in FIG. 1 in a sectional illustration along the section line A-A indicated in FIG. 1. FIG. 2b shows the roof rail illustrated in FIG. 2a in a sectional view along the section line B-B indicated in FIG. 2a.

In order to fasten the roof rail 1 shown in FIG. 2a/2b and FIG. 3, fastening means are provided by means of which the roof rail 1 can be fastened to a roof structure of a motor vehicle and via which loads acting on the rail profile 2 are dissipated into the roof structure 15. In FIG. 2a and FIG. 3, the roof structure 15 forms, by way of example, a roof channel within which the roof rail 1 is arranged in a slightly sunk manner with respect to the surrounding outer roof skin. In the embodiments illustrated in FIG. 2a/2b and FIG. 3, the fastening means include, by way of example, a rivet nut 20, a screw 21 and the adapter bridge 22, which is visible in particular from FIGS. 2a and 2b and which is illustrated only in part in FIG. 3. The adapter bridge 22 has legs which are directly visible only in FIG. 2a/2b and which in turn are fastened to the roof structure via a screw connection. The roof rail 1 is thus supported directly on the roof structure of the motor vehicle via the adapter bridge 22.

As is visible in particular from FIG. 2a and FIG. 3, the roof rail 1 is of multi-part design and has a strip-shaped, extruded rail profile 2 as upper part and a likewise strip-shaped decorative profile 3 as a lower part. The rail profile 2 has a fastening leg 4 on which the fastening means act and via which any bearing load is transferred via the fastening means to the roof structure.

In the embodiment shown in FIG. 2a/2b, the rail profile is supported on the roof structure 15 via the fastening means, whereas the decorative profile 3 is fastened to the rail profile 2 by other means. The decorative profile 3 can, in particular, be adhesively bonded to the rail profile 2 or else be prefixed on the rail profile 2 via screw or rivet connections. The load-free design of the decorative profile has the advantage that decorative profile cross sections such as that visible from FIG. 2a can also be used, which form a decorative surface only on one side.

In the embodiment shown in FIG. 3, a mounting leg 5 of the decorative profile 3 bears on the underside against the fastening leg 4 and is connected to the rail profile 2 via the same fastening means via which the rail profile 2 is supported on the roof structure.

The rail profile 2 and decorative profile 3 thus supplement one another to form an overall profile cross section with a first lateral surface 6' and a second lateral surface 6". Here, the fastening leg 4 and the mounting leg 5 together form, with respect to the overall cross section, a horizontally oriented central web 7 which bridges the gap between the first lateral surface 6' and the second lateral surface 6".

The decorative profile 3 furthermore bridges a vertical visual gap L between an outer visible edge of the rail profile 2 and the outer roof skin, with formation of a lower part of the first lateral surface 6' with a first lateral leg 8'. Here, the outwardly pointing surface of the lateral leg 8' forms the decorative surface, which is depicted by cross-hatching in FIG. 1 and which, in the sectional view illustrated in FIG. 3, is formed as a coating and is highlighted in black, whereas this surface in the exemplary embodiment shown in FIG. 2a is formed by the material of the decorative profile itself.

FIG. 2a and FIG. 3 show that the mounting leg 5 of the decorative profile 3 extends inwards starting from the first lateral leg 8', wherein the mounting leg 5 is attached to the inner side of the lateral leg 8' below the upper end of the lateral leg 8'. As a result, the upper end of the lateral leg 8' forms an engagement leg 9 which engages in an outwardly pointing first groove-like depression 10' extending along the rail profile 2. The mounting leg 5 itself is likewise inserted by its end facing away from the first lateral leg 8' into a second groove-like receptacle 10" provided on the rail profile 2.

By contrast with the exemplary embodiment illustrated in FIG. 2a/2b, the exemplary embodiment illustrated in FIG. 3 has a decorative profile 3 in the form of an inverted U which forms a decorative surface on both sides of an imaginary centre plane M. The structure of that part of the decorative profile situated on the left side of the imaginary centre plane M in FIG. 3 corresponds to that shown in FIG. 2a. On the side (on the right in FIG. 3) facing away from the first lateral leg 8', the mounting leg 5 transitions, with formation of an outwardly pointing groove-like depression 11 into which there engages an inwardly pointing, substantially horizontally oriented engagement leg 12 formed on the rail profile, into a second lateral leg 8" which, with formation of a further decorative surface, supplements the second outer lateral surface 6" of the overall profile cross section in the downward direction. Such an arrangement of the decorative profile 3 below the rail profile 2 makes it possible to create a decorative surface on both sides of the roof rail 1 with, at the same time, a high-strength connection between rail profile 2 and decorative profile 3 and also with the use of different materials.

What is common to the embodiments shown in FIG. 2a/2b and FIG. 3 is that the decorative profile 3 is in each case connected load-free to the load-absorbing rail profile 2. This means that the loads (static or dynamic weight forces and/or (transverse) acceleration forces) acting on the rail profile 2 are introduced directly via the fastening means, and without a "detour" via the decorative profile 3, into the roof structure and thus into the vehicle structure supporting the loads. As a result, it is possible for the decorative profile to be designed to be freed from any loading situations since it has to fulfil exclusively decorative functions and does not perform any load-bearing function.

This construction also makes it possible to produce the decorative profile 3 from materials and/or with material thicknesses and/or by means of production methods which would not be suitable for a situation in which the decorative profile would have to carry out load-bearing functions. Thus, for example, the decorative profile used can also be an injection-moulded or press-formed plastic profile with a rather thin material thickness.

The embodiments in FIG. 2a/2b and in FIG. 3 differ to the effect that, in the embodiment according to FIG. 2a/2b, a cutout 14 is provided in the mounting leg 5 of the decorative profile, through which cutout a connecting portion, in the region of which the fastening means act on the fastening leg 4 of the rail profile 2 in order to connect the rail profile 2 to the roof structure, is held free from the decorative profile 3, in particular from its mounting leg.

By contrast, FIG. 3 shows an embodiment in which these cutouts are not provided. Here, the fastening means (in the exemplary embodiment the screw 21 and the rivet nut 20) engage not only through the fastening leg 4 of the rail profile 2 but also through the mounting leg 5 of the decorative profile 3. Here, furthermore, even before mounting the roof rail 1 on the roof structure, the decorative profile 3 is prefixed on the rail profile via a fastening means (in the exemplary embodiment the rivet nut 20) which simultaneously also serves for fastening the rail profile to the roof structure. As a result, mounting is made considerably easier.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

What is claimed is:

1. A roof rail, designed for fastening to a roof structure of a motor vehicle, comprising a rail profile and, in at least one sub-portion, a decorative profile for forming at least a first decorative surface, wherein the rail profile has a fastening leg on which fastening means act when the roof rail is mounted as intended on the roof structure, in order to secure the rail profile to the roof structure, and the decorative profile is connected load-free to the rail profile via the fastening leg, wherein the fastening means act on the fastening leg of the rail profile such that a load acting on the rail profile is introduced directly via the fastening means into the roof structure without a detour via the decorative profile.

2. The roof rail according to claim 1, wherein the decorative profile is also connected to the rail profile at least also by means of the fastening means with which the rail profile is fastened to the roof structure.

3. The roof rail according to claim 2, wherein at least one cutout is provided on the decorative profile, through which cutout the fastening means with which the rail profile is fastened to the roof structure engage without simultaneously connecting the decorative profile to the rail profile.

4. The roof rail according to claim 3, wherein the decorative profile has, in at least the sub-portion, a decorative profile cross section with an inwardly pointing mounting leg which bears against the fastening leg.

5. The roof rail according claim 4, wherein at least in the sub-portion in which the decorative profile is provided, a vertical gap L between a lower visible edge of the rail profile and the outer roof skin is bridged by the decorative profile.

6. A roof rail, designed for fastening to a roof structure of a motor vehicle, comprising a rail profile and, in at least one sub-portion, a decorative profile for forming at least a first decorative surface, wherein the rail profile has a fastening leg on which fastening means act when the roof rail is mounted as intended on the roof structure, in order to secure the rail profile to the roof structure, and the decorative profile is connected load-free to the rail profile via the fastening leg;

wherein the decorative profile is also connected to the rail profile at least also by means of the fastening means with which the rail profile is fastened to the roof structure;

wherein at least one cutout is provided on the decorative profile, through which cutout the fastening means with which the rail profile is fastened to the roof structure engage without simultaneously connecting the decorative profile to the rail profile;

wherein the decorative profile has, in at least the sub-portion, a decorative profile cross section with an inwardly pointing mounting leg which bears against the fastening leg;

wherein at least in the sub-portion in which the decorative profile is provided, a vertical gap L between a lower visible edge of the rail profile and the outer roof skin is bridged by the decorative profile; and wherein the rail profile has a rail profile cross section and the decorative profile has a decorative profile cross section which together form an overall profile cross section with two substantially vertically oriented lateral surfaces and a substantially horizontally oriented central leg, wherein the central leg is formed at least in part by the fastening leg of the rail profile.

7. The roof rail according to claim 6, wherein the decorative profile has a decorative profile cross section with a first lateral leg which forms the outer decorative surface and, starting from which, the mounting leg extends inwards.

8. The roof rail according to claim 7, wherein the rail profile or the decorative profile has at least one groove-like depression into which an engagement leg of the respective other profile is inserted.

9. The roof rail according to claim 8, wherein a first lateral leg projects beyond the mounting leg on the upper side with formation of an engagement leg and is inserted into a groove-like depression provided on the rail profile.

10. The roof rail according to claim 9, wherein the mounting leg forms, at its end facing away from the first lateral leg forming the decorative surface, an engagement leg which is inserted into an inwardly pointing groove-like receptacle provided on the rail profile.

11. The roof rail according to claim 10, wherein an outwardly pointing groove-like depression is formed on the decorative profile, into which depression an inwardly pointing engagement leg formed on the rail profile is inserted.

12. The roof rail according to claim 11, wherein the decorative profile is arranged below the rail profile.

13. The roof rail according to claim 12, wherein the decorative profile forms a first decorative surface on one side of a centre plane M of the rail profile and forms a second decorative surface on the other side of the centre plane M of the rail profile.

14. The roof rail according to claim 12, wherein the decorative profile is designed in such a way that it forms a decorative surface only on one side of a centre plane M of the rail profile.

* * * * *